(12) United States Patent
Goto et al.

(10) Patent No.: US 11,618,009 B2
(45) Date of Patent: Apr. 4, 2023

(54) HONEYCOMB CATALYTIC CONVERTER

(71) Applicants: IBIDEN CO., LTD., Ogaki (JP); TOYOTA JIDOSHA KABUSHIKI KAISHA, Toyota (JP)

(72) Inventors: Shinnosuke Goto, Ibi-gun (JP); Takumi Tojo, Toyota (JP); Takeru Yoshida, Toyota (JP); Hiromasa Suzuki, Toyota (JP)

(73) Assignees: IBIDEN CO., LTD., Ogaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 16/830,279

(22) Filed: Mar. 26, 2020

(65) Prior Publication Data
US 2020/0222881 A1    Jul. 16, 2020

Related U.S. Application Data

(63) Continuation of application No. PCT/JP2018/035859, filed on Sep. 27, 2018.

(30) Foreign Application Priority Data

Sep. 27, 2017  (JP) .............................. JP2017-186477

(51) Int. Cl.
*B01J 21/04*      (2006.01)
*B01J 21/06*      (2006.01)
(Continued)

(52) U.S. Cl.
CPC ........ *B01J 23/462* (2013.01); *B01D 53/9472* (2013.01); *B01J 23/10* (2013.01);
(Continued)

(58) Field of Classification Search
CPC . B01J 21/04; B01J 21/066; B01J 23/10; B01J 23/44; B01J 23/464; B01J 23/56;
(Continued)

(56) References Cited

U.S. PATENT DOCUMENTS 5,139,992 A * 8/1992 Tauster ................ B01D 53/945
                                                      423/213.5
5,296,198 A    3/1994 Abe et al.
(Continued)

FOREIGN PATENT DOCUMENTS

CN        1883908        12/2006
CN        1906385         1/2007
(Continued)

OTHER PUBLICATIONS

Office Action with Form PTO-892 Notice of References Cited issued by the United States Patent and Trademark Office for the co-pending U.S. Appl. No. 16/830,275, dated Jan. 7, 2021.
(Continued)

*Primary Examiner* — Cam N. Nguyen
(74) *Attorney, Agent, or Firm* — Mori & Ward, LLP (57) ABSTRACT

The present invention relates to a honeycomb catalytic converter, including: a honeycomb structured body in which multiple through-holes are arranged longitudinally in parallel with one another with a partition wall therebetween; and Pd and Rh supported on the partition walls of the honeycomb structured body, wherein the honeycomb structured body is an extrudate containing a ceria-zirconia complex oxide and alumina, a Pd-carrying region where only Pd is supported is formed on the partition walls within a predetermined width from one end of the honeycomb structured body, and a Rh-carrying region where only Rh is supported is formed on the partition walls within a predetermined width from the other end of the honeycomb structured body, (Continued)

and the Pd-carrying region extends to at least 50% of the length of the honeycomb structured body, and the Rh-carrying region extends to at least 20% of the length of the honeycomb structured body.

7 Claims, 3 Drawing Sheets

(51) Int. Cl.
| | |
|---|---|
| *B01J 23/10* | (2006.01) |
| *B01J 23/44* | (2006.01) |
| *B01J 23/46* | (2006.01) |
| *B01J 23/56* | (2006.01) |
| *B01J 23/63* | (2006.01) |
| *B01J 35/00* | (2006.01) |
| *B01J 35/04* | (2006.01) |
| *F01N 3/28* | (2006.01) |
| *B01D 53/94* | (2006.01) |

(52) U.S. Cl.
CPC ........... *B01J 23/44* (2013.01); *B01J 35/0006* (2013.01); *B01J 35/04* (2013.01); *F01N 3/28* (2013.01); *B01D 2255/1023* (2013.01); *B01D 2255/1025* (2013.01); *B01D 2255/9032* (2013.01); *F01N 2330/02* (2013.01); *F01N 2370/02* (2013.01)

(58) Field of Classification Search
CPC ........ B01J 23/63; B01J 35/0006; B01J 35/04; F01N 3/28; B01D 53/9472
USPC ....... 502/304, 332–334, 339, 349, 355, 415, 502/439, 527.12, 527.13, 527.19
See application file for complete search history.

(56) References Cited

U.S. PATENT DOCUMENTS

| | | | | |
|---|---|---|---|---|
| 5,318,757 | A * | 6/1994 | Abe | B01D 53/945 422/177 |
| 5,376,610 | A * | 12/1994 | Takahata | F01N 3/222 502/65 |
| 5,459,119 | A | 10/1995 | Abe et al. | |
| 5,753,580 | A | 5/1998 | Hayashi et al. | |
| 5,895,700 | A | 4/1999 | Yamada et al. | |
| 6,087,298 | A * | 7/2000 | Sung | F01N 3/2803 502/328 |
| 6,492,297 | B1 * | 12/2002 | Sung | B01D 53/945 502/302 |
| 6,497,851 | B1 * | 12/2002 | Hu | B01J 37/0228 422/177 |
| 6,916,450 | B2 * | 7/2005 | Akama | F01N 13/0097 422/177 |
| 7,731,774 | B2 | 6/2010 | Ohno et al. | |
| 7,737,077 | B2 * | 6/2010 | Kitamura | B01J 23/40 502/262 |
| 7,759,283 | B2 | 7/2010 | Yamato et al. | |
| 7,871,452 | B2 | 1/2011 | Yamada et al. | |
| 7,871,689 | B2 * | 1/2011 | Kunieda | C04B 38/0006 428/116 |
| 8,048,382 | B2 * | 11/2011 | Ohno | B01J 35/04 422/180 |
| 8,057,745 | B2 * | 11/2011 | Toyoda | B01J 23/63 422/177 |
| 8,071,502 | B2 * | 12/2011 | Shimizu | B01J 35/0006 502/325 |
| 8,207,078 | B2 * | 6/2012 | Lu | B01J 23/63 502/64 |
| 8,226,898 | B2 * | 7/2012 | Miwa | B01J 37/0205 422/180 |
| 8,323,766 | B2 | 12/2012 | Ido et al. | |
| 8,323,767 | B2 | 12/2012 | Ido et al. | |
| 8,337,791 | B2 * | 12/2012 | Kohara | B01D 53/945 60/299 |
| 8,491,847 | B2 * | 7/2013 | Kato | B01D 53/945 422/177 |
| 8,580,705 | B2 | 11/2013 | Aoki et al. | |
| 8,691,157 | B2 | 4/2014 | Kunieda et al. | |
| 8,796,172 | B2 | 8/2014 | Chinzei | |
| 8,961,886 | B2 | 2/2015 | Kunieda et al. | |
| 9,266,092 | B2 * | 2/2016 | Arnold | B01J 23/63 |
| 9,440,223 | B2 * | 9/2016 | Aoki | B01J 35/0006 |
| 9,550,169 | B2 | 1/2017 | Kadota | |
| 9,597,663 | B2 * | 3/2017 | Inoda | B01J 23/464 |
| 9,700,842 | B2 | 7/2017 | Miyairi et al. | |
| 10,472,290 | B2 | 11/2019 | Goto et al. | |
| 10,507,457 | B2 | 12/2019 | Kadota et al. | |
| 10,625,208 | B2 * | 4/2020 | Bergeal | B01D 53/9472 |
| 10,953,395 | B2 | 3/2021 | Goto et al. | |
| 11,185,854 | B2 * | 11/2021 | Rajaram | B01J 37/0244 |
| 2004/0001781 | A1 | 1/2004 | Kumar et al. | |
| 2006/0292330 | A1 | 12/2006 | Ohno et al. | |
| 2007/0039295 | A1 | 2/2007 | Ohno | |
| 2008/0081761 | A1 | 4/2008 | Suzuki | |
| 2009/0239744 | A1 | 9/2009 | Ohno et al. | |
| 2009/0246103 | A1 | 10/2009 | Ohno et al. | |
| 2009/0247402 | A1 | 10/2009 | Ohno et al. | |
| 2009/0291826 | A1 | 11/2009 | Ohno et al. | |
| 2010/0087314 | A1 | 4/2010 | Kitamura et al. | |
| 2010/0196221 | A1 | 8/2010 | Ando et al. | |
| 2010/0263357 | A1 | 10/2010 | Lindner et al. | |
| 2011/0041486 | A1 | 2/2011 | Kato et al. | |
| 2011/0047975 | A1 * | 3/2011 | Nakayama | B01D 53/945 60/299 |
| 2011/0200505 | A1 | 8/2011 | Cavataio et al. | |
| 2012/0070346 | A1 | 3/2012 | Mizutani et al. | |
| 2013/0011304 | A1 | 1/2013 | Schumann | |
| 2013/0336864 | A1 * | 12/2013 | Zheng | B01J 35/1042 502/415 |
| 2014/0030158 | A1 | 1/2014 | Takagi et al. | |
| 2014/0205523 | A1 | 7/2014 | Arnold et al. | |
| 2015/0209726 | A1 | 7/2015 | Difrancesco et al. | |
| 2015/0375206 | A1 | 12/2015 | Aoki | |
| 2016/0074800 | A1 | 3/2016 | Ito et al. | |
| 2017/0232429 | A1 | 8/2017 | Aoki | |
| 2017/0297007 | A1 | 10/2017 | Umemoto et al. | |
| 2017/0306823 | A1 | 10/2017 | Onoe et al. | |
| 2018/0015411 | A1 | 1/2018 | Onoe et al. | |
| 2018/0229183 | A1 | 8/2018 | Kadota et al. | |
| 2019/0136730 | A1 | 5/2019 | Onozuka et al. | |
| 2019/0143312 | A1 | 5/2019 | Goto et al. | |
| 2019/0144342 | A1 | 5/2019 | Goto et al. | |
| 2020/0222882 | A1 | 7/2020 | Goto et al. | |
| 2020/0222883 | A1 | 7/2020 | Goto et al. | |
| 2020/0222884 | A1 | 7/2020 | Goto et al. | |
| 2020/0222889 | A1 | 7/2020 | Goto et al. | |
| 2020/0222890 | A1 | 7/2020 | Goto et al. | |

FOREIGN PATENT DOCUMENTS

| | | |
|---|---|---|
| CN | 101376103 | 3/2009 |
| CN | 101543792 | 9/2009 |
| CN | 102083531 | 6/2011 |
| CN | 102430403 | 5/2012 |
| CN | 103157470 | 6/2013 |
| CN | 106794458 | 5/2017 |
| CN | 107084030 | 8/2017 |
| EP | 0559844 B1 | 9/1993 |
| EP | 0798042 | 10/1997 |
| EP | 2130600 | 12/2009 |
| EP | 2239037 | 10/2010 |
| EP | 2556871 | 2/2013 |
| GB | 2558186 | 7/2018 |
| JP | 62-068543 | 3/1987 |
| JP | 07-060117 | 3/1995 |
| JP | 10-296085 | 11/1998 |
| JP | 2002-210371 | 7/2002 |
| JP | 2004-066069 | 3/2004 |
| JP | 2005-530614 | 10/2005 |
| JP | 2006-188404 | 7/2006 |

(56) References Cited

FOREIGN PATENT DOCUMENTS

| | | |
|---|---|---|
| JP | 2006-205050 | 8/2006 |
| JP | 2009-011937 | 1/2009 |
| JP | 2009-255032 | 11/2009 |
| JP | 2009-255033 | 11/2009 |
| JP | 2009-273988 | 11/2009 |
| JP | 2010-127210 | 6/2010 |
| JP | 2010-172825 | 8/2010 |
| JP | 2012-040547 | 3/2012 |
| JP | 2013-522020 | 6/2013 |
| JP | 2014-147858 | 8/2014 |
| JP | 2014-151306 | 8/2014 |
| JP | 2015-085241 | 5/2015 |
| JP | 2016-505380 | 2/2016 |
| JP | 2016-123890 | 7/2016 |
| JP | 2016-131968 | 7/2016 |
| JP | 2017-006827 | 1/2017 |
| JP | 2017-039069 | 2/2017 |
| WO | WO 2004/002621 | 1/2004 |
| WO | WO 2011/125766 | 10/2011 |
| WO | WO 2014/116897 | 7/2014 |
| WO | WO 2016/060048 | 4/2016 |

OTHER PUBLICATIONS

Office Action with Form PTO-892 Notice of References Cited issued by the United States Patent and Trademark Office for the co-pending U.S. Appl. No. 16/830,277, dated Jan. 7, 2021.

Office Action with Form PTO-892 Notice of References Cited issued by the United States Patent and Trademark Office for the co-pending U.S. Appl. No. 16/830,275, dated Jul. 19, 2021.

Office Action with Form PTO-892 Notice of References Cited issued by the United Stales Patent and Trademark Office for the co-pending U.S. Appl. No. 16/830,277, dated Aug. 4, 2021.

Office Action with Form PTO-892 Notice of References Cited issued by the United Stales Patent and Trademark Office for the co-pending U.S. Appl. No. 16/830,272, dated Aug. 31, 2021.

Office Action with Form PTO-892 Notice of References Cited issued by the United States Patent and Trademark Office for the co-pending U.S. Appl. No. 16/830,276, dated Aug. 31, 2021.

Office Action with Form PTO-892 Notice of References Cited issued by the United States Patent and Trademark Office for the co-pending U.S. Appl. No. 16/830,278, dated Aug. 31, 2021.

Advisory Action issued by the U.S. Patent and Trademark Office for the co-pending U.S. Appl. No. 16/830,275, dated Nov. 19, 2021.

Notice of Allowance issued by the United States Patent and Trademark Office for the co-pending U.S. Appl. No. 16/830,272, dated Dec. 13, 2021.

Notice of Allowance issued by the United States Patent and Trademark Office for the co-pending U.S. Appl. No. 16/830,276, dated Dec. 13, 2021.

Notice of Allowance issued by the United States Patent and Trademark Office for the co-pending U.S. Appl. No. 16/830,278, dated Dec. 14, 2021.

Advisory Action issued by the U.S. Patent and Trademark Office for the co-pending U.S. Appl. No. 16/830,277, dated Dec. 15, 2021.

\* cited by examiner

HONEYCOMB CATALYTIC CONVERTER

TECHNICAL FIELD

The present invention relates to a honeycomb catalytic converter.

BACKGROUND ART

Exhaust gas discharged from internal combustion engines of automobiles and the like contains harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer that is formed by wash-coating the slurry containing noble metal particles having catalytic activity, a co-catalyst, and the like on a honeycomb monolithic substrate made of cordierite or the like (see Patent Literature 1).

Patent Literature 2 discloses an exhaust gas catalytic converter including a monolithic substrate containing ceria-zirconia composite oxide particles and θ-phase alumina particles, wherein noble metal particles are supported on the monolithic substrate.

In the exhaust gas catalytic converter disclosed in Patent Literature 2, cordierite is not used as a material of the monolithic substrate, but a material that functions as a catalyst carrier and a co-catalyst is used. Thus, the monolithic substrate has a low bulk density and can be easily heated, which presumably results in improved warm-up performance of the catalyst.

In addition, in the exhaust gas catalytic converter disclosed in Patent Literature 2, the monolithic substrate is immersed and left for a certain period of time in an aqueous solution in which necessary amounts of palladium nitrate and rhodium chloride are dispersed, whereby Pd and Rh are supported on the monolithic substrate.

CITATION LIST

Patent Literature
Patent Literature 1: JP 2006-188404 A
Patent Literature 2: JP 2015-85241 A

SUMMARY OF INVENTION

Technical Problem

Yet, when Pd and Rh are supported on the substrate in such a manner that both metals are mixed as described in Patent Literature 1 and Patent Literature 2, the metals form an alloy while they are used as catalysts, resulting in poor exhaust gas conversion performance.

The present invention was made to solve the above problem, and aims to provide a honeycomb catalytic converter capable of maintaining exhaust gas conversion performance because Pd and Rh supported on the honeycomb catalytic converter do not form an alloy during use as catalysts, or the proportion of alloy is low even if the alloy is formed.

Solution to Problem

The honeycomb catalytic converter of the present invention which was made to achieve the above object includes: a honeycomb structured body in which multiple through-holes are arranged longitudinally in parallel with one another with a partition wall therebetween; and Pd and Rh supported on the partition walls of the honeycomb structured body, wherein the honeycomb structured body is an extrudate containing a ceria-zirconia complex oxide and alumina, a Pd-carrying region where only Pd is supported is formed on the partition walls within a predetermined width from one end of the honeycomb structured body, and a Rh-carrying region where only Rh is supported is formed on the partition walls within a predetermined width from the other end of the honeycomb structured body, and the Pd-carrying region extends to at least 50% of the length of the honeycomb structured body, and the Rh-carrying region extends to at least 20% of the length of the honeycomb structured body.

According to the honeycomb catalytic converter of the present invention, the Pd-carrying region extends to at least 50% of the length of the honeycomb structured body, and the Rh-carrying region extends to at least 20% of the length of the honeycomb structured body. Pd and Rh are supported in separate regions with sufficient size, so that Pd and Rh do not form an alloy during use as catalysts, or the proportion of alloy is low even if the alloy is formed. As a result, the honeycomb catalytic converter can maintain exhaust gas conversion performance. In addition, the honeycomb structured body is obtained in the form of an extrudate, and Pd and Rh are supported on the partition walls without using alumina particles or the like which serve as a catalyst supporting carrier. This prevents an increase in the coating thickness of a portion where these noble metals overlap each other, thus restraining an increase in pressure loss.

In the honeycomb catalytic converter of the present invention, preferably the honeycomb structured body further contains an inorganic binder.

In the honeycomb catalytic converter of the present invention, when the honeycomb structured body further contains an inorganic binder, the mechanical strength of the honeycomb structured body can be increased.

In the honeycomb catalytic converter of the present invention, preferably, a Pd/Rh-carrying region where both Pd and Rh are supported on the partition walls is present between the Pd-carrying region and the Rh-carrying region, and the Pd/Rh-carrying region extends to 20% or less of the length of the honeycomb structured body.

In the honeycomb catalytic converter of the present invention, the Pd/Rh-carrying region extends to 20% or less of the length of the honeycomb structured body. Since the proportion of the Pd/Rh-carrying region relative to the entire catalyst-carrying region is low, the exhaust gas conversion performance is hardly decreased.

Preferably, in the honeycomb catalytic converter of the present invention, the honeycomb structured body contains 25 to 75 wt % ceria-zirconia complex oxide.

In the honeycomb catalytic converter of the present invention, when the honeycomb structured body contains 25 to 75 wt % ceria-zirconia complex oxide, cerium can have a higher oxygen storage capacity (OSC).

In the honeycomb catalytic converter of the present invention, preferably, the honeycomb structured body has a diameter of 130 mm or less.

In the honeycomb catalytic converter of the present invention, when the diameter of the honeycomb structured body is 130 mm or less, the variation in the temperature distribution in the honeycomb structured body can be reduced, which can further increase the thermal shock resistance of the honeycomb structured body.

DESCRIPTION OF EMBODIMENTS

[Honeycomb catalytic converter]

First, the honeycomb catalytic converter of the present invention is described.

The honeycomb catalytic converter of the present invention includes: a honeycomb structured body in which multiple through-holes are arranged longitudinally in parallel with one another with a partition wall therebetween; and Pd and Rh supported on the partition walls of the honeycomb structured body, wherein the honeycomb structured body is an extrudate containing a ceria-zirconia complex oxide and alumina, a Pd-carrying region where only Pd is supported is formed on the partition walls within a predetermined width from one end of the honeycomb structured body, and a Rh-carrying region where only Rh is supported is formed on the partition walls within a predetermined width from the other end of the honeycomb structured body, and the Pd-carrying region extends to at least 50% of the length of the honeycomb structured body, and the Rh-carrying region extends to at least 20% of the length of the honeycomb structured body.

The honeycomb structured body defining the honeycomb catalytic converter of the present invention is defined by a honeycomb fired body produced by firing an extrudate containing ceria-zirconia complex oxide particles (hereinafter also referred to as "CZ particles") and alumina particles. The honeycomb catalytic converter contains catalysts supported on the partition walls of the honeycomb structured body.

Whether or not the honeycomb catalytic converter of the present invention contains the above components can be confirmed by X-ray diffraction (XRD).

The honeycomb structured body defining the honeycomb catalytic converter of the present invention may include a single honeycomb fired body or multiple honeycomb fired bodies, and the multiple honeycomb fired bodies may be combined together with an adhesive layer.

The honeycomb catalytic converter of the present invention includes a honeycomb structured body in which multiple through-holes are arranged longitudinally in parallel with one another with a partition wall therebetween, and Pd and Rh are supported on the partition walls as described below.

The honeycomb catalytic converter in which Pd and Rh that function as catalysts are supported on the partition walls can be suitably used a honeycomb catalytic converter for converting exhaust gas.

The following describes an embodiment of the honeycomb catalytic converter of the present invention in which Pd and Rh are supported in the honeycomb structured body.

Figure 1A:
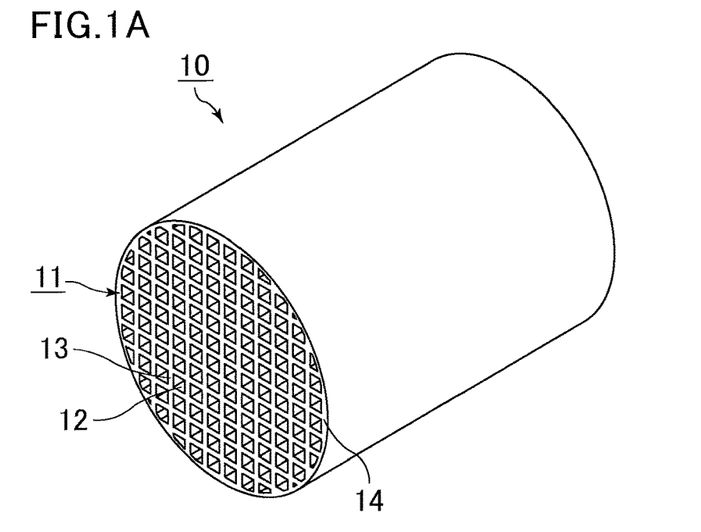
FIG. 1A is a schematic perspective view of an example of a honeycomb catalytic converter of the present invention.
Figure 1B:
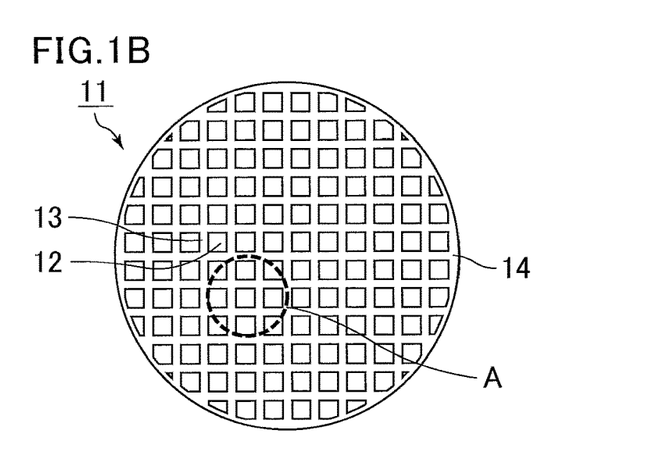
FIG. 1B is a front view of the honeycomb catalytic converter shown in FIG. 1A.
Figure 1C:
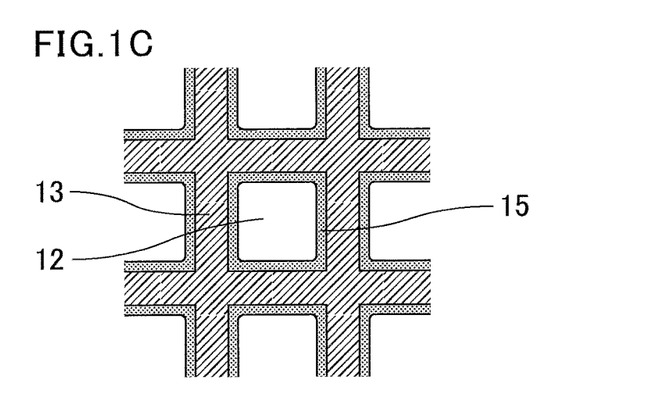
FIG. 1C is an enlarged front view of a portion A of the honeycomb catalytic converter shown in FIG. 1B.

FIG. 1A is a schematic perspective view of an example of the honeycomb catalytic converter of the present invention. FIG. 1B is a front view of the honeycomb catalytic converter shown in FIG. 1A. FIG. 1C is an enlarged front view of a portion A of the honeycomb catalytic converter shown in FIG. 1B.

A honeycomb catalytic converter 10 shown in FIG. 1A and FIG. 1B includes a honeycomb structured body 11 including a single honeycomb fired body in which multiple through-holes 12 are arranged longitudinally in parallel with one another with a partition wall 13 therebetween and a peripheral wall 14 is disposed at an outer periphery of the honeycomb fired body. The honeycomb structured body 11 contains CZ particles and alumina particles, and is in the form of an extrudate. As shown in FIG. 1C, a catalyst 15 is supported on the partition walls 13.

In the honeycomb catalytic converter of the present invention, a Pd-carrying region where only Pd is supported is formed on the partition walls within a predetermined width from one end of the honeycomb structured body defining the honeycomb catalytic converter, and a Rh-carrying region where only Rh is supported is formed on the partition walls within a predetermined width from the other end of the honeycomb structured body, and the Pd-carrying region extends to at least 50% of the length of the honeycomb structured body, and the Rh-carrying region extends to at least 20% of the length of the honeycomb structured body.

Figure 2A:
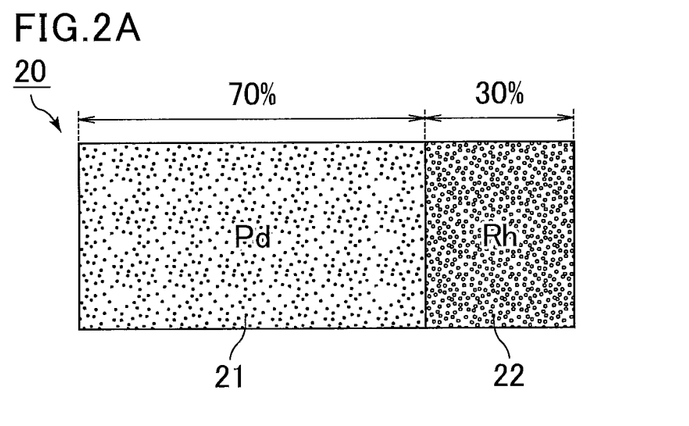
FIG. 2A, FIG. 2B, and FIG. 2C are each a schematic illustration of a Pd-carrying region and a Rh-carrying region in a planar view of the honeycomb catalytic converter of the present invention.
Figure 2B:
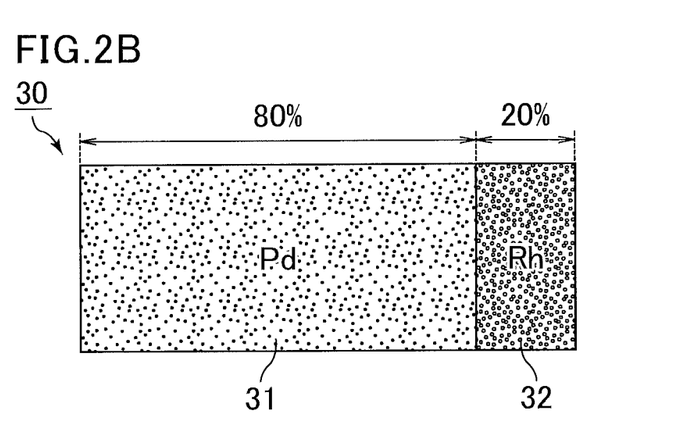
Figure 2C:
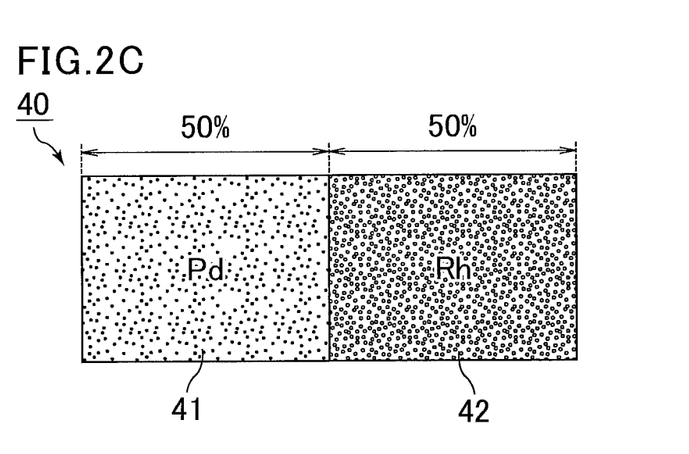
Figure 2D:
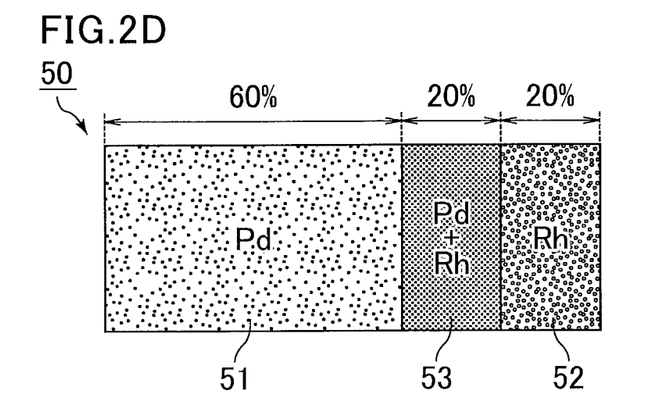
FIG. 2D is a schematic illustration of a Pd-carrying region, a Rh-carrying region, and a Pd/Rh-carrying region in a planar view of the honeycomb catalytic converter of the present invention.

FIG. 2A, FIG. 2B, and FIG. 2C are each a schematic illustration of a Pd-carrying region and a Rh-carrying region in a planar view of the honeycomb catalytic converter of the present invention. FIG. 2D is a schematic illustration of a Pd-carrying region, a Rh-carrying region, and a Pd/Rh-carrying region in a planar view of the honeycomb catalytic converter of the present invention.

In a honeycomb catalytic converter 20 shown in FIG. 2A, a Pd-carrying region 21 extends to 70% of the length of the honeycomb structured body, and a Rh-carrying region 22 extends 30% of the length of the honeycomb structured body. In the present invention, the Pd-carrying region 21 extends to at least 50% of the length of the honeycomb structured body, and the Rh-carrying region 22 extends at least 20% of the length of the honeycomb structured body. Thus, these Pd-carrying region and Rh-carrying region are within the scope of the present invention.

In the honeycomb catalytic converter 20 shown in FIG. 2A, a Pd/Rh-carrying region where both Pd and Rh are supported may be present in at least a portion of the Pd-carrying region 21 or the Rh-carrying region 22. Yet, it is essential that the Pd-carrying region 21 extends to 50% or more of the length of the honeycomb structured body, and the Rh-carrying region 22 extends to 20% or more of the length of the honeycomb structured body.

In a honeycomb catalytic converter 30 shown in FIG. 2B, a Pd-carrying region 31 extends to 80% of the length of the honeycomb structured body, and a Rh-carrying region 32 extends to 20% of the length of the honeycomb structured body. In this case, the Pd-carrying region 31 and the Rh-carrying region 32 are within the scope of the present invention. The honeycomb catalytic converter 30 shown in FIG. 2B is a case where the Pd-carrying region 31 is the largest.

In the honeycomb catalytic converter 30 shown in FIG. 2B, a Pd/Rh-carrying region in which both Pd and Rh are supported may be present in at least a portion of the Pd-carrying region 31. Yet, it is essential that the Pd-carrying region 31 extends to 50% or more of the length of the honeycomb structured body.

In a honeycomb catalytic converter 40 shown in FIG. 2C, a Pd-carrying region 41 extends to 50% of the length of the honeycomb structured body, and a Rh-carrying region 42 extends to 50% of the length of the honeycomb structured body. In this case, the Pd-carrying region 41 and the Rh-carrying region 42 are within the scope of the present invention. The honeycomb catalytic converter 40 shown in FIG. 2C is a case where the Rh-carrying region 42 is the largest.

In the honeycomb catalytic converter 40 shown in FIG. 2C, a Pd/Rh-carrying region in which both Pd and Rh are supported may be present in at least a portion of the Rh-carrying region 42. Yet, it is essential that the Rh-carrying region 42 extends to 20% or more of the length of the honeycomb structured body.

In a honeycomb catalytic converter 50 shown in FIG. 2D, a Pd-carrying region 51 extends to 60% of the length of the honeycomb structured body, a Rh-carrying region 52 extends to 20% of the length of the honeycomb structured body, and a Pd/Rh-carrying region 53 extends to 20% of the length of the honeycomb structured body. In this case, the Pd-carrying region 51 and the Rh-carrying region 52 are within the scope of the present invention.

In the honeycomb catalytic converter 50 shown in FIG. 2D, the Pd/Rh-carrying region 53 extends to 20% of the length of the honeycomb structured body. Preferably, the Pd/Rh-carrying region 53 extends to 20% or less of the length of the honeycomb structured body.

According to the honeycomb catalytic converter of the present invention, the Pd-carrying region extends to at least 50% of, the length of the honeycomb structured body, and the Rh-carrying region extends to at least 20% of the length of the honeycomb structured body. Pd and Rh are supported in separate regions with sufficient size, so that Pd and Rh do not form an alloy during use as catalysts, or the proportion of alloy is low even if the alloy is formed. As a result, the honeycomb catalytic converter can maintain exhaust gas conversion performance.

In addition, the honeycomb structured body is obtained in the form of an extrudate, and Pd and Rh are supported on the partition walls without using alumina particles or the like which serve as a catalyst supporting carrier. This prevents an increase in the coating thickness of a portion where these noble metals overlap each other, thus restraining an increase in pressure loss.

In the honeycomb catalytic converter of the present invention, the Pd-carrying region preferably extends to 50 to 70% of the length of the honeycomb structured body, and the Rh-carrying region preferably extends to 20 to 40% of the length of the honeycomb structured body.

In the honeycomb structured body, the ceria-zirconia complex oxide forming the CZ particles is a material used as a co-catalyst (oxygen storage material) of the exhaust gas catalytic converter. The ceria-zirconia complex oxide preferably forms a solid solution of ceria and zirconia.

In the honeycomb catalytic converter of the present invention, the ceria-zirconia complex oxide may contain another rare earth element in addition to cerium. Example of the rare earth element include scandium (Sc), yttrium (Y), lanthanum (La), praseodymium (Pr), neodymium (Nd), samarium (Sm), gadolinium (Gd), terbium (Tb), dysprosium (Dy), ytterbium (Yb), and ruthenium (Lu).

The honeycomb catalytic converter of the present invention includes a honeycomb structured body in the form of an extrudate containing a ceria-zirconia complex oxide and alumina.

In the honeycomb catalytic converter of the present invention, the amount of ceria in the ceria-zirconia complex oxide is preferably 30 wt % or more, more preferably 40 wt % or more, and preferably 90 wt % or less, more preferably 80 wt % or less. The amount of zirconia in the ceria-zirconia complex oxide is preferably 60 wt % or less, more preferably 50 wt % or less. Such a ceria-zirconia complex oxide has a high ceria content and thus has a high OSC.

In the honeycomb catalytic converter of the present invention, the alumina particles defining the honeycomb structured body may be of any type, but θ-phase alumina particles (hereinafter also referred to as "θ-alumina particles") are preferred.

Use of θ-alumina particles as dividers for the ceria-zirconia complex oxide can prevent sintering of the particles to one another by heat during use, allowing for sustained catalytic function. Further, use of θ-phase alumina particles can increase heat resistance.

In the honeycomb catalytic converter of the present invention, the honeycomb structured body preferably contains inorganic particles that are used as an inorganic binder during the production, and more preferably contains γ-alumina particles derived from boehmite.

In the honeycomb catalytic converter of the present invention, the honeycomb structured body preferably contains inorganic fibers, more preferably alumina fibers.

The honeycomb structured body containing inorganic fibers such as alumina fibers can have better mechanical characteristics.

The inorganic fibers are those having an aspect ratio of 5 or more, and the inorganic particles are those having an aspect ratio of less than 5.

In the honeycomb catalytic converter of the present invention, in order to increase thermal shock resistance, preferably, CZ particles contained in the honeycomb structured body have an average particle size of 1 to 50 μm. The average particle size of the CZ particles is more preferably 1 to 30 μm. When the CZ particles have an average particle size of 1 to 50 μm, the resulting honeycomb catalytic converter has a larger surface area, thus achieving a higher OSC.

In the honeycomb catalytic converter of the present invention, the alumina particles contained in the honeycomb structured body may have any average particle size. Yet, in order to increase exhaust gas conversion performance and warm-up performance, the average particle size is preferably 1 to 10 μm, more preferably 1 to 5 μm.

The average particle sizes of the CZ particles and alumina particles contained in the honeycomb structured body can be determined by taking a scanning electron microscope (SEM) image of the honeycomb structured body with a SEM (S-4800 available from Hitachi High-Technologies Corporation).

In the honeycomb catalytic converter of the present invention, preferably, the honeycomb structured body contains 25 to 75 wt % CZ particles.

In the honeycomb catalytic converter of the present invention, when the honeycomb structured body contains 25 to 75 wt % ceria-zirconia complex oxide, cerium can have a higher OSC.

Preferably, the honeycomb catalytic converter of the present invention contains 15 to 35 wt % alumina particles.

In the honeycomb catalytic converter of the present invention, the honeycomb catalytic converter of the present invention preferably has a length to diameter ratio (length/diameter) of 0.5 to 1.1, more preferably 0.6 to 0.8.

In the honeycomb catalytic converter of the present invention, the diameter of the honeycomb structured body is preferably 130 mm or less, more preferably 125 mm or less. The diameter of the honeycomb structured body is also preferably 85 mm or more.

In the honeycomb catalytic converter of the present invention, when the diameter of the honeycomb structured body is 130 mm or less, the variation in the temperature distribution in the honeycomb structured body can be reduced, which can further increase the thermal shock resistance of the honeycomb structured body.

In the honeycomb catalytic converter of the present invention, the length of the honeycomb structured body is preferably 65 to 120 mm, more preferably 70 to 110 mm.

The shape of the honeycomb structured body defining the honeycomb catalytic converter of the present invention is not limited to a round pillar shape. Examples include a prism, a cylindroid shape, a pillar shape having an end face with a racetrack shape, and a prism with rounded corners (e.g., a triangular pillar shape with rounded corners).

In the honeycomb catalytic converter of the present invention, preferably, all the partition walls of the honeycomb structured body have the same thickness. Specifically, the thickness of each partition wall of the honeycomb structured body is preferably 0.05 to 0.50 mm, more preferably 0.05 to 0.30 mm.

In the honeycomb catalytic converter of the present invention, the shape of the through-holes formed in the honeycomb structured body is not limited to a quadrangular pillar shape. For example, it may be a triangular pillar shape or a hexagonal pillar shape.

In the honeycomb catalytic converter of the present invention, preferably, the density of the through-holes in a cross section perpendicular to the longitudinal direction of the honeycomb structured body is 31 to 155 pcs/cm$^2$.

In the honeycomb catalytic converter of the present invention, preferably, the honeycomb structured body has a porosity of 40 to 70%. When the porosity of the honeycomb structured body is in the above range, the honeycomb structured body can exhibit high exhaust gas conversion performance while the strength is maintained.

The honeycomb catalytic converter of the present invention may include a peripheral coat layer on the outer periphery of the honeycomb structured body.

When the peripheral coat layer is formed on the outer periphery of the honeycomb structured body, preferably, the thickness of the peripheral coat layer is 0.1 to 2.0 mm.

The porosity of the honeycomb structured body can be measured by a weighing method described below.

(1) The honeycomb structured body is cut in size of 10 cells×10 cells'×10 mm to obtain a measurement sample. The sample is ultrasonically washed with deionized water and acetone, and dried in an oven at 100° C.

(2) Using a measuring microscope (Measuring Microscope MM-40 available from Nikon, magnification: 100 times), the cross-sectional dimension of the sample is measured, and the volume is determined from a geometric calculation (when the volume cannot be determined from a geometric calculation, the volume is measured by measuring the water-saturated weight and the weight in water).

(3) The weight of the measurement sample based on assumption that the sample is a completely dense body is calculated from the calculated volume and the true density of the sample measured with a pycnometer. A measurement procedure using a pycnometer is as described below.

(4) Method of measuring true density using pycnometer

The honeycomb structured body is pulverized to prepare 23.6 cc of powder. The powder is dried at 200° C. for 8 hours. Subsequently, the true density is measured according to JIS R 1620:1995, using Auto Pycnometer 1320 available from Micromeritics. The evacuation time is 40 minutes.

(5) Next, the actual weight of the sample is measured using an electric balance (HR202i available from A & D).

(6) The porosity is calculated by the following formula (1).

$$100-(\text{Actual weight/weight as completely dense body})\times 100(\%) \quad (1)$$

In the honeycomb catalytic converter of the present invention, the total amount of Pd and Rh supported is preferably 0.1 to 15 g/L, more preferably 0.5 to 10 g/L.

The expression "the total amount of Pd and Rh supported" as used herein refers to the total weight of Pd and Rh per apparent volume of the honeycomb structured body. The apparent volume of the honeycomb structured body includes the volume of pores and cells. When the honeycomb structured body includes multiple honeycomb fired bodies, combined together with an adhesive layer therebetween, the apparent volume includes the volume of the adhesive layer.

[Method of Producing Honeycomb Catalytic Converter]

Next, a method producing the honeycomb catalytic converter of the present invention is described.

(Raw Material Paste Preparation Step)

First, the method of producing the honeycomb catalytic converter of the present invention includes a raw material paste preparation step in which a raw material paste containing CZ particles, alumina particles, inorganic fibers, an inorganic binder, and the like is prepared. The raw material paste may also contain an organic binder, a pore-forming agent, a forming auxiliary, a dispersion medium, and the like.

The weight percentage of CZ particles is preferably 40 to 60 wt %, and the weight percentage of alumina particles is preferably 15 to 35 wt %. The weight percentage of inorganic fibers is preferably 5 to 15 wt %, and the weight percentage of inorganic binder is preferably 10 to 20 wt %.

The CZ particles are used as a co-catalyst, and have a function to enhance the catalytic effect of a catalyst supported. When the proportion of the CZ particles is less than 40 wt %, the function to enhance the catalytic effect is insufficient, and use of the CZ particles provides no advantage. When the proportion of the CZ particles is more than 60 wt %, the proportions of other materials such as alumina are low, which makes it difficult to produce a honeycomb structured body having heat resistance.

When the proportion of the alumina particles is less than 15 wt %, it is difficult to control the pore distribution, which makes it difficult to produce a honeycomb structured body having excellent exhaust gas conversion performance. When the proportion of the alumina particles is more than 35 wt %, the proportion of the CZ particles is relatively low, which weakens the function of the CZ particles to enhance the catalytic effect. The alumina particles are preferably θ-alumina particles.

The weight ratio of the CZ particles to the alumina particles (CZ particles/alumina particles) is preferably 1.0 to 3.0.

When the weight ratio (CZ particles/alumina particles) is 1.0 to 3.0, the proportion of the CZ particles is high. Since the CZ particles are used as a co-catalyst, the CZ particles can enhance the catalytic effect of a catalyst supported, and can further improve the performance of the honeycomb catalytic converter.

When the proportion of the inorganic fibers is less than 5 wt %, the inorganic fibers fail to sufficiently reinforce the sintered body, resulting in poor mechanical characteristics of the honeycomb structured body. When the proportion of the inorganic fibers is more than 15 wt %, the proportions of other materials are low, resulting in poor exhaust gas conversion performance.

When the proportion of the inorganic binder is less than 10 wt %, the proportion of the inorganic binder is so low that the raw material paste has low viscosity and cannot be easily extrusion-molded. When the proportion of the inorganic binder is more than 20 wt %, the proportion of the inorganic binder is so high that the raw material paste has too low viscosity and cannot be easily extrusion-molded into a predetermined shape.

The average particle size of the alumina particles, particularly θ-alumina, is preferably 1 to 5 μm. While the average particle size of the CZ particles is also preferably 1 to 5 μm, the average particle size of the alumina particles used is preferably larger than the average particle size of the CZ particles.

The average particle sizes of the alumina particles and the CZ particles used as raw materials can be determined by a laser diffraction particle size distribution meter (Mastersizer 2000 available from Malvern Panalytical).

A honeycomb structured body having excellent warm-up performance can be produced by using the CZ particles, the alumina particles, the inorganic fibers, and the inorganic binder in the above-described proportions, and a pore-forming agent.

Any pore-forming agent may be used. Examples include acrylic resins, coke, and starch. In the present invention, use of two, or more selected from acrylic resins, coke, and starch is preferred.

The pore-forming agent is one that is used to introduce pores into a honeycomb fired body when producing a honeycomb fired body. The amount of the pore-forming agent relative to the whole raw material composition is preferably 1 to 10 wt %.

Examples of other raw material to prepare the raw material paste include organic binders, pore-forming agents, forming auxiliaries, and dispersion media.

Any organic binder may be used. Examples include methyl cellulose, carboxymethyl cellulose, hydroxyethyl cellulose, polyethylene glycol, phenolic resin, and epoxy resin. Two or more of these may be used in combination.

Any dispersion medium may be used. Examples include water, organic solvents such as benzene, and alcohols such as methanol. Two or more of these may be used in combination.

Any forming auxiliary may be used. Examples include ethylene glycol, dextrins, fatty acids, fatty acid soaps, and polyalcohols. Two or more of these may be used in combination.

Preparation of the raw material paste preferably involves mixing/kneading of the raw materials. A device such as a mixer or an attritor may be used for mixing, or a device such as a kneader may be used for kneading.

(Molding Step)

In the method of producing the honeycomb catalytic converter of the present invention, the raw material paste prepared by the above method is molded with a die having a lattice pattern to produce a honeycomb molded body in which multiple through-holes are arranged longitudinally in parallel with one another with a partition wall therebetween. Specifically, the raw material paste is passed through a die and extrusion-molded into a honeycomb molded body.

At this point, a continuous honeycomb molded body can be formed by passing the raw material paste through a die for extrusion molding, and a honeycomb molded body having a predetermined length can be formed by cutting the continuous honeycomb molded body to a predetermined length.

(Drying Step)

In the method of producing the honeycomb catalytic converter of the present invention, the molded body obtained by the molding step is dried.

Here, preferably, a dryer such a microwave dryer, a hot-air dryer, a dielectric dryer, a reduced-pressure dryer, a vacuum dryer, or a freeze-dryer is used to dry the honeycomb molded body to produce a honeycomb dried body. Of these, a freeze-drying method that uses a microwave dryer and a freeze-dryer is preferred.

In freeze-drying, it is further preferred to decompress the honeycomb catalytic converter after freezing. Preferred freezing conditions to perform freeze-drying are as follows: the molded body is frozen at a temperature of −30° C. or lower for 1 to 48 hours, and the molded body in the frozen state is decompressed 1 to 600 Pa to sublimate the moisture in a reduced pressure environment for 1 to 120 hours.

Through freeze-drying of the molded body, a large amount of moisture in the raw material paste is directly sublimated in the frozen state, so that macropores are easily formed, and the macropores can have a large pore size. Thus, when the resulting product is used as a honeycomb catalytic converter, surrounding exhaust gas can be easily diffused into the pores, achieving higher exhaust gas conversion performance.

Herein, the honeycomb molded body before drying, and the honeycomb molded body and the honeycomb dried body before firing are also collectively referred to as a "honeycomb molded body".

(Firing Step)

The method of producing the honeycomb catalytic converter of the present invention include a firing step in which the molded body dried in the drying step is fired to produce a honeycomb fired body (honeycomb structured body) that defines a honeycomb catalytic converter. In this step, the honeycomb molded body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours. The atmosphere of the firing step is not limited, but an atmosphere with an oxygen concentration of 1 to 20% is preferred.

(Supporting Step)

In the method of producing the honeycomb catalytic converter of the present invention, Pd and Rh are supported on the partition walls of the honeycomb structured body.

For example, noble metals can be supported on the partition walls by a method in which the honeycomb fired body or the honeycomb structured body is immersed in a, solution containing Pd, Rh, or a complex of Pd or Rh, removed from the solution, and heated.

In the honeycomb catalytic converter of the present invention, the Pd-carrying region extends to at least 50% of the length of the honeycomb structured body, and the Rh-carrying region extends to at least 20% of the length of the honeycomb structured body.

Specifically, a Pd-carrying region formation step is performed as follows: for example, when immersing the honeycomb structured body in a solution containing Pd or a complex of Pd, the honeycomb structured body is immersed, from one of its end faces, in the solution containing. Pd or a complex Pd such that the Pd-carrying region extends to at least 50% of the length of the honeycomb structured body, so as to attach the Pd or complex of Pd to a part of the partition walls.

Subsequently, a Rh-carrying region formation step is performed as follows. When immersing the honeycomb structured body in a solution containing Rh or a complex of Rh, the honeycomb structured body is immersed, from the other end face that was not immersed in the Pd-carrying region formation step, in the solution containing Rh or a complex of Rh such that the Rh-carrying region extends to at least 20% of the length of the honeycomb structured body, so as to attach the Rh or Rh complex to a part of the partition walls.

Pd and Rh may be supported in such a manner that the Pd-carrying region and the Rh-carrying region do not overlap each other or the Pd-carrying and the Rh-carrying region overlap each other.

Subsequently, the honeycomb structured body is dried at a temperature around 100° C., and heated, whereby Pd and Rh are securely attached to the partition walls. When the Pd-carrying region and the Rh-carrying region do not overlap each other, the honeycomb structured body is heated once. When the Pd-carrying region and the Rh-carrying region overlap each other, the honeycomb structured body is heated once, or is heated after the Pd-carrying region formation step and after the Rh-carrying region formation step (i.e., twice).

Preferably, the heating is performed at 300° C. to 800° C. in an inert atmosphere such as nitrogen for 0.5 to 3 hours.

In the method of producing the honeycomb catalytic converter of the present invention, in the supporting step, the total amount of Pd and Rh supported is preferably 0.1 to 15 g/L, more preferably 0.5 to 10 g/L.

In the method of producing the honeycomb catalytic converter of the present invention, a honeycomb structured body in which multiple honeycomb fired bodies are combined together with an adhesive layer therebetween can be produced by applying an adhesive layer paste to the outer periphery of each honeycomb fired body excluding both end faces thereof, combining the honeycomb fired bodies, and solidifying the adhesive layer paste by drying. The adhesive layer paste may have the same composition as that of the raw material paste.

EXAMPLES

Examples that more specifically disclose the present invention are described below. The present invention is not limited to these examples.

Example 1

The following materials were mixed/kneaded into a raw material paste: CZ particles (average particle size: 2 μm) (26.4 wt %); θ-alumina particles (average particle size: 2 μm) (13.2 wt %); alumina fibers (average fiber diameter: 3 μm; average fiber length: 60 μm) (5.3 wt %); boehmite as an inorganic binder (11.3 wt %); methylcellulose as an organic binder (5.3 wt %); an acrylic resin as an pore-forming agent (2.1 wt %); coke also as an pore-forming agent (2.6 wt %); polyoxyethylene oleyl ether (surfactant) as a forming auxiliary (4.2 wt %); and deionized water (29.6 wt %).

Using an extruder, the raw material paste was extrusion-molded with a die into a round pillar-shaped honeycomb molded body.

Then, using a reduced-pressure microwave dryer, the honeycomb molded body was dried at an output of 1.74 kW under a reduced pressure of 6.7 kPa for 12 minutes, and then degreased/fired at 1100° C. for 10 hours, whereby a honeycomb fired body defined by a honeycomb structured body was produced.

The honeycomb structured body produced in Example 1 had a round pillar shape with a diameter of 103 mm and a length of 105 mm in which the density of the through-holes was 77.5 pcs/cm$^2$ (500 cpsi) and the thickness of each partition wall was 0.127 mm (5 mil).

Next, a catalyst supporting step was performed as follows.

Specifically, first, a dinitro diammine palladium nitrate solution ($[Pd(NH_3)_2(NO_2)_2]HNO_3$, palladium concentration: 100 g/L) was prepared, and the honeycomb structured body produced by the above steps was immersed in the solution from one of its end faces. The honeycomb structured body was held when 70% of the length of the honeycomb structured body was immersed, and this state was maintained for 24 hours.

Next, a rhodium nitrate solution ($[Rh(NO_3)_3]$, rhodium concentration: 50 g/L) was prepared, and the honeycomb structured body that underwent the above step was immersed in the solution from the other end face that was not immersed in the dinitro diammine palladium nitrate solution. The honeycomb structured body was held when 30% of the length of the honeycomb structured body was immersed, and this state was maintained for 24 hours.

Subsequently, the honeycomb structured body was dried at 110° C. for 2 hours, and fired at 500° C. for 1 hour in a nitrogen atmosphere, whereby a honeycomb catalytic converter was obtained in which a Pd (palladium) catalyst was supported on a region extending to 70% of the length of the honeycomb structured body and a Rh (rhodium) catalyst was supported on a region extending to 30% of the length of the honeycomb structured body. The Pd catalyst and the Rh catalyst were separately supported.

Example 2

A honeycomb catalytic converter was produced as in Example 1, except that the catalyst supporting step was performed as follows.

Specifically, first, a dinitro diammine palladium nitrate solution ($[Pd(NH_3)_2(NO_2)_2]HNO_3$, palladium concentration: 100 g/L) was prepared, and the honeycomb structured body produced by the above steps was immersed in the solution from one of its end faces. The honeycomb structured body was held when 80% of the length of the honeycomb structured body was immersed, and this state was maintained for 24 hours. Subsequently, the honeycomb structured body was dried at 110° C. for 2 hours, and fired at 500° C. in 1 hour in a nitrogen atmosphere, whereby a Pd-carrying region extending to 80% of the length of the honeycomb structured body was formed on the honeycomb structured body.

Next, a rhodium nitrate solution ($[Rh(NO_3)_3]$, rhodium concentration: 50 g/L) was prepared, and the honeycomb structured body produced by the above steps was immersed in the solution from the other end face that was not immersed in the dinitro diammine palladium nitrate solution. The honeycomb structured body was held when 40% of the length of the honeycomb structured body was immersed, and this state was maintained for 24 hours.

Subsequently, the honeycomb structured body was dried at 110° C. for 2 hours, and fired at 500° C. for 1 hour in a nitrogen atmosphere, whereby a honeycomb catalytic converter was obtained in which the Rh-carrying region, the Pd/Rh-carrying region, and the Pd-carrying region on the honeycomb structured body extended to 20%, 20%, and 60%, respectively, of the length of the honeycomb structured body.

Comparative Example 1

A honeycomb catalytic converter was produced as in Example 1, except that the catalyst supporting step was performed as follows.

A dinitro diammine palladium nitrate solution ($[Pd(NH_3)_2(NO_2)_2]HNO_3$, palladium concentration 100 g/L) and a rhodium nitrate solution ($[Rh(NO_3)_3]$, rhodium concentration: 50 g/L) were mixed at a volume ratio of 3:1 to prepare a mixed solution. The honeycomb structured body produced by the above steps was completely immersed and kept in the mixed solution for 24 hours. Subsequently, the honeycomb structured body was dried at 110° C. for 2 hours, and fired at 500° C. for 1 hour in a nitrogen atmosphere, whereby a honeycomb catalytic converter was obtained in which a Pd catalyst and a Rh catalyst were supported on the entire partition walls of the honeycomb structured body.

[Measurement of Exhaust Gas Conversion Rate]

The NOx exhaust gas conversion performance of each of the honeycomb catalytic converters produced in Examples 1 and 2 and Comparative Example 1 after thermal durability treatment was measured by the following method.

A V8-4.3 L gasoline engine was used for the thermal durability treatment of each of the honeycomb catalytic converters according to Examples 1 and 2 and Comparative Example 1. The catalytic converters of Examples 1 and 2 and Comparative Example 1 were sequentially used in a catalytic system for converting exhaust gas which includes a start-up converter (S/C) and an underfloor converter (UF/C). First, the bed temperature of the S/C was set to 1000° C. A cycle that repeats stoichiometric feedback, fuel-cut, rich, and lean within one minute was run for 50 hours.

Subsequently, each of the honeycomb catalytic converters of Examples 1 and 2 and Comparative Example 1 after the thermal durability treatment was set in a V6-3.5 L engine to measure and the amount of NOx emission in exhaust gas after the exhaust gas passed through each catalytic converter in JC08 mode (hot and cold start). The measurement conditions were as follows. Table 1 shows the results. In Table 1, the results are shown as the amount of NOx emission collected in the cold phase.

In addition, each of the honeycomb catalytic converters of Examples 1 and 2 and Comparative Example 1 after the thermal durability treatment was set in a V6-3.5 L engine to measure the NOx exhaust gas conversion performance in a rich condition. The lambda was set to 0.98. Table 1 shows the results. In Table 1, the results are shown as the NOx exhaust gas conversion rates in the rich condition.

TABLE 1

| | Proportion of Rd-carrying region [%] | Proportion of Rh-carrying region [%] | Proportion of Rd/Rh-carrying region [%] | Amount of NOx emission in cold phase [g/km] | NOx exhaust gas conversion rates in rich condition [%] |
|---|---|---|---|---|---|
| Example 1 | 70 | 30 | 0 | 0.0554 | 95 |
| Example 2 | 60 | 20 | 20 | 0.0489 | 98 |
| Comparative Example 1 | 0 | 0 | 100 | 0.0785 | 70 |

As is clear from the results shown in Table 1, each of the honeycomb catalytic converters according to Examples 1 and 2 was capable of maintaining exhaust gas conversion performance after the thermal durability treatment, as compared to the honeycomb catalytic converter according to Comparative Example 1, owing to the Pd-carrying region extending to at least 50% of the length of the honeycomb structured body and the Rh-carrying region extending to at least 20% of the length of the honeycomb structured body. In contrast, the honeycomb catalytic converter according to Comparative Example 1 in which both catalysts (Pd and Rh) were supported in a mixed manner on the partition walls clearly showed a low exhaust gas conversion rate after the thermal durability treatment and poor exhaust gas conversion performance.

REFERENCE SIGNS LIST 10, 20, 30, 40, 50 honeycomb catalytic converter
11 honeycomb structured body
12 through-hole
13 partition wall
14 peripheral wall
15 catalyst
21, 31, 41, 51 Pd-carrying region
22, 32, 42, 52 Rh-carrying region
53 Pd/Rh-carrying region

The invention claimed is:

1. A honeycomb catalytic converter, comprising:
a honeycomb structured body in which multiple through-holes are arranged longitudinally in parallel with one another with a partition wall therebetween; and
Pd and Rh directly supported on the partition walls of the honeycomb structured body,
wherein the honeycomb structured body is an extrudate containing a ceria-zirconia complex oxide, alumina, and an inorganic binder,
a Pd-carrying region where only Pd is directly supported is formed on the partition walls extending from one end of the honeycomb structured body, and a Rh-carrying region where only Rh is directly supported is formed on the partition walls extending from the other end of the honeycomb structured body, and
the Pd-carrying region extends to at least 50% of the length of the honeycomb structured body, and the Rh-carrying region extends to at least 20% of the length of the honeycomb structured body.

2. The honeycomb catalytic converter according to claim 1, wherein
a Pd/Rh-carrying region where both Pd and Rh are directly supported on the partition walls is present between the Pd-carrying region and the Rh-carrying region, and the Pd/Rh-carrying region extends to 20% or less of the length of the honeycomb structured body.

3. The honeycomb catalytic converter according to claim 2, wherein the honeycomb structured body contains 25 to 75 wt % ceria-zirconia complex oxide.

4. The honeycomb catalytic converter according to claim 2, wherein the honeycomb structured body has a diameter of 130 mm or less.

5. The honeycomb catalytic converter according to claim 1, wherein the honeycomb structured body contains 25 to 75 wt % ceria-zirconia complex oxide.

6. The honeycomb catalytic converter according to claim 5, wherein the honeycomb structured body has a diameter of 130 mm or less.

7. The honeycomb catalytic converter according to claim 1, wherein the honeycomb structured body has a diameter of 130 mm or less.

* * * * *